United States Patent [19]
Templeton et al.

[11] Patent Number: 6,006,434
[45] Date of Patent: Dec. 28, 1999

[54] QUICK-RELEASE COMPONENT CONNECTOR FOR LAWN TOOL

[75] Inventors: Jack B. Templeton, Williamsburg; Scott L. Hesson, Richmond, both of Ind.

[73] Assignee: Hoffco, Inc., Richmond, Ind.

[21] Appl. No.: 08/941,374

[22] Filed: Sep. 30, 1997

[51] Int. Cl.⁶ ................................................. A01D 50/00
[52] U.S. Cl. ............................ 30/296.1; 30/276; 403/325
[58] Field of Search .................... 30/122, 276, 296.1; 403/321, 325, 322.4

[56] References Cited

U.S. PATENT DOCUMENTS

| | | | |
|---|---|---|---|
| 844,130 | 2/1907 | Howard | 403/325 |
| 2,545,813 | 3/1951 | Jackson | 403/325 |
| 3,625,551 | 12/1971 | Branton et al. | |
| 3,693,255 | 9/1972 | Langenstein | |
| 4,023,332 | 5/1977 | Achenbach et al. | |
| 4,049,059 | 9/1977 | Weibling | |
| 4,052,789 | 10/1977 | Ballas | |
| 4,122,601 | 10/1978 | Katsuya | |
| 4,268,964 | 5/1981 | Moore | |
| 4,335,585 | 6/1982 | Hoff | |
| 4,364,435 | 12/1982 | Tuggle et al. | |
| 4,451,983 | 6/1984 | Johnson et al. | 30/276 |
| 4,463,498 | 8/1984 | Everts | |
| 4,505,040 | 3/1985 | Everts | |
| 4,603,478 | 8/1986 | Anderson | |
| 4,697,832 | 10/1987 | Dickirson | |
| 4,733,471 | 3/1988 | Rahe | 30/296.1 |
| 4,829,675 | 5/1989 | Beihoffer | |
| 4,841,929 | 6/1989 | Tuggle et al. | |
| 4,899,446 | 2/1990 | Akiba et al. | 30/296.1 |
| 4,989,323 | 2/1991 | Casper et al. | |
| 4,991,298 | 2/1991 | Matre | |
| 5,272,788 | 12/1993 | Gilstrap | |
| 5,397,270 | 3/1995 | Pipp et al. | |
| 5,662,428 | 9/1997 | Wilson | |
| 5,787,590 | 8/1998 | D'Alessandro, Sr. | 30/296.1 |
| 5,802,724 | 9/1998 | Rickard et al. | 30/276 |
| 5,842,810 | 12/1998 | Morad | 403/325 |

*Primary Examiner*—Hwei-Slu Payer
*Attorney, Agent, or Firm*—Barnes & Thornburg

[57] ABSTRACT

A lawn tool is provided having a drive assembly, a plurality of driven assemblies, and a connector that permits removal of a given driven assemblies from the drive assembly. The drive assembly includes a motor, a first tube, and a first shaft coupled to the motor and positioned to lie in the first tube. Each driven assembly includes an implement, a second tube, and a second drive shaft coupled to the implement and positioned to lie in the second tube. The connector includes a housing coupled to the first and second tubes and a trigger coupled to the housing for movement between a locking position coupling the first and second tubes together and a releasing position permitting removal of the second tube away from the first tube so that the driven assembly may be removed from the drive assembly.

48 Claims, 2 Drawing Sheets

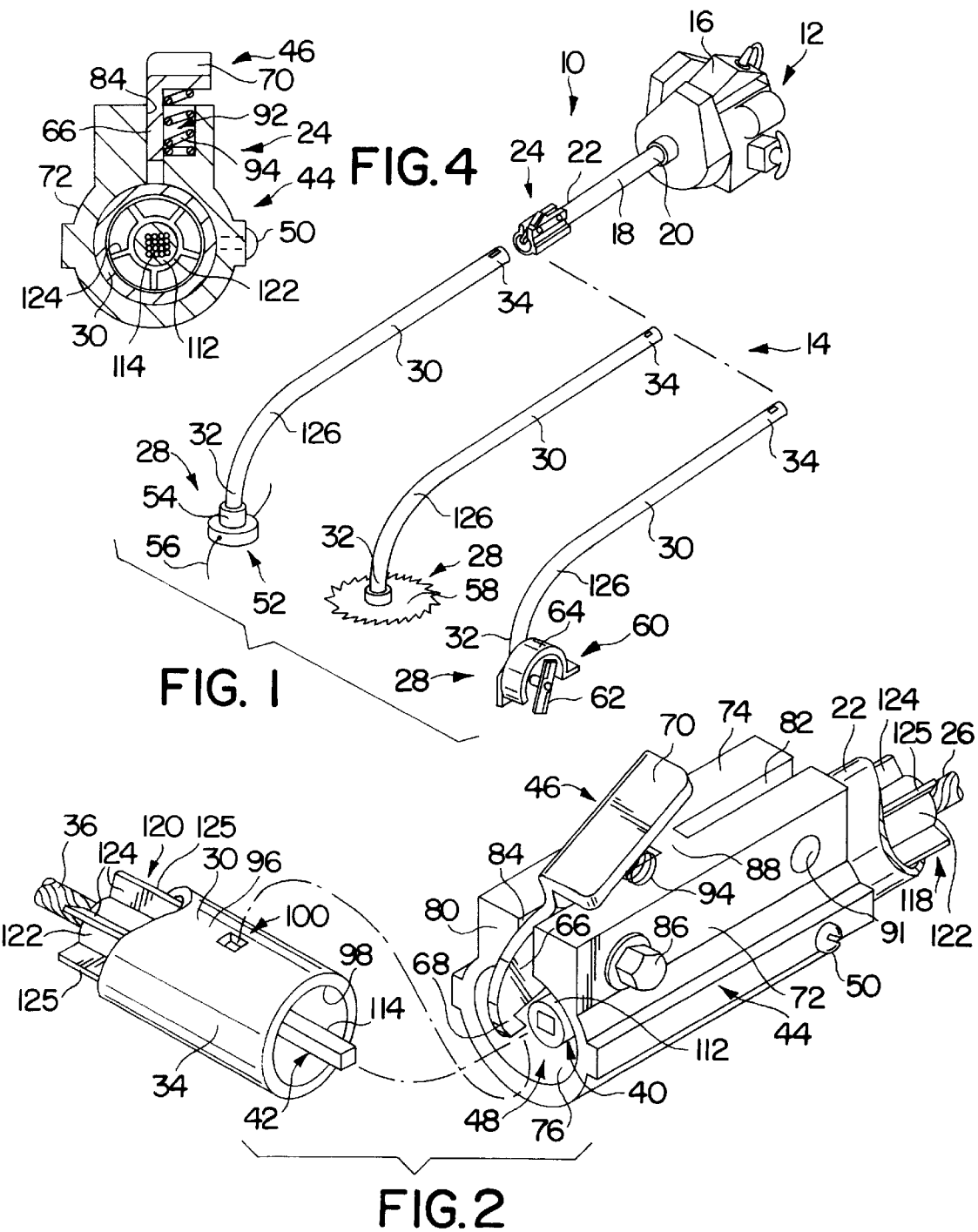

QUICK-RELEASE COMPONENT CONNECTOR FOR LAWN TOOL

BACKGROUND AND SUMMARY OF THE INVENTION

The present invention relates to a lawn tool and particularly to a hand-held lawn tool having a motor, a shaft assembly extending from the motor, and an implement for doing lawn work coupled to a bottom end of the shaft assembly. More particularly, the present invention relates to a quick-release component connector that connects components of the lawn tool together.

Hand-held lawn tools having a motor at one end and some sort of lawn tool implement at the other end are known. The lawn tool implements of conventional lawn tools are available in a variety of configurations to accomplish a variety of lawn and gardening tasks. Typical lawn tool implements include, for example, string trimmers for trimming grass and weeds, saw blades for cutting thick brush, and edgers for creating an edge along a sidewalk. The implement of any particular lawn tool is usually best suited to perform only a single task, although some lawn tools have assemblies that allow the position of the implement to be adjusted relative to a handle of the lawn tool so that the same implement can be used to perform different tasks, such as weed trimming and edging.

According to the present invention, a lawn tool system is provided including a driving assembly and a plurality of driven assemblies that are each separately and selectively attachable to the driving assembly. The driving assembly includes a motor and a first tube extending from the motor. The first tube has an end spaced apart from the motor. An output shaft is coupled to the motor and is rotated by the motor. The output shaft is positioned to lie inside the first tube and has an end adjacent to the end of the first tube. A first coupling member is associated with the end of the output shaft. The driving assembly further includes a connector having an adapter tube mounted to the end of the first tube and a trigger coupled to the adapter tube for movement between a releasing position and a locking position.

Each of the plurality of driven assemblies includes an implement and a second tube extending from the implement. Each second tube has an end spaced apart from the implement. Each of the plurality of driven assemblies also includes a driven shaft coupled to the implement so that rotation of the driven shaft moves the implement. Each driven shaft has an end adjacent to the end of the second tube. A second coupling member is associated with the end of each driven shaft. Coupling the end of any of the second tubes to the adapter tube mates the respective second coupling member with the first coupling member so that the output shaft and driven shaft rotate together. The trigger engages the second tube when in the locking position to prevent axial and rotational movement of the second tube relative to the adapter tube. The trigger is disengaged from the second tube when in the releasing position allowing the second tube to be separated away from the adapter tube.

The implements of the driven assemblies are configured to perform a variety of different lawn and gardening tasks. For example, one implement is a string trimmer, one implement is a brush saw, and another implement is an edger. It is within the scope of the invention as presently perceived for other types of implements to be included in the driven assemblies. In preferred embodiments, the second shaft of each of the driven assemblies includes a bent portion adjacent to the implement and the driven shaft is a flexible shaft that conforms to the bent portion of the second shaft.

When the trigger is in the locking position so that the second tube is fixed axially and rotationally relative to the first tube, the first coupling member mates with the second coupling member so that rotation of the output shaft by the motor acts through the first and second coupling members to rotate the driven shaft to move the implement coupled to the driven shaft. The second tube is formed to include an aperture adjacent to the end thereof and the trigger includes a tab received in the aperture when in the locking position. Receipt of the tab in the aperture orients the second tube axially and rotationally relative to the first tube. The connector further includes a spring engaging the trigger to bias the trigger toward the locking position.

Additional features and advantages of the present invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 1 is a perspective view of a lawn tool having a quick-release component connector in accordance with the present invention showing a motor, a first tube extending from the motor, the quick-release component connector coupled to an end of the first tube, a representative sampling of lawn tool components, each of the lawn tool components including as tube that is configured at one end to be coupled to the first tube by the quick-release component connector;

FIG. 2 is an enlarged perspective view of a portion of the lawn tool of FIG. 1, with portions broken away, showing the quick-release component connector including a connector housing fixed to the first tube and a trigger pivotably mounted to the connector housing, the trigger including an upwardly facing thumb pad and a downwardly extending tab, an internal coupler including a female member positioned to lie in an interior region of the connector housing and a male member extending outwardly from the top end of the second tube, and a top end of the second tube having a square-shaped aperture that the tab to couple the second tube to the quick-release component connector.

FIG. 4 is a sectional view of the lawn tool portion taken along line 4—4 of FIG. 3 showing that the male and female members of the coupler are substantially coaxial with the first and second tubes;

DETAILED DESCRIPTION OF THE DRAWINGS

Figure 3:
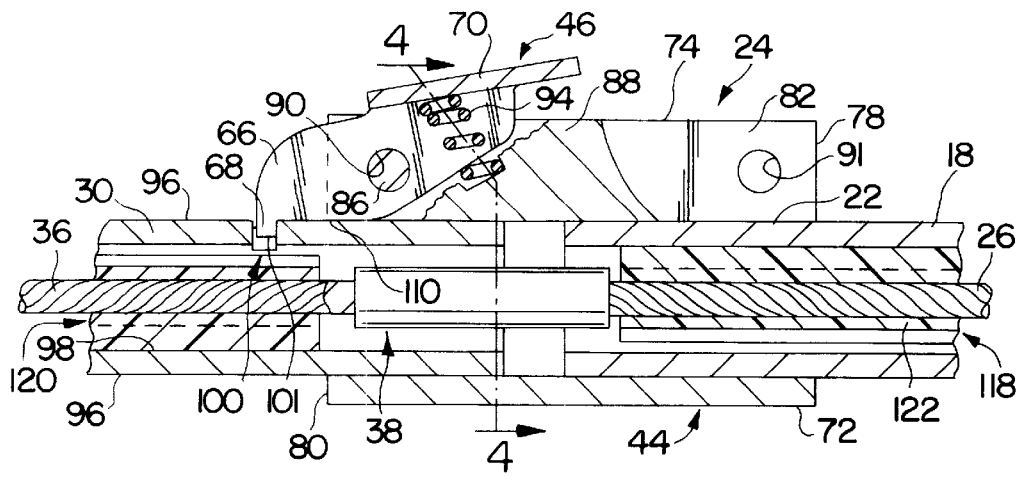
FIG. 3 is a sectional view of the portion of the lawn tool of FIG. 2 (once assembled) showing the top end of the second tube received in the interior region of the connector housing, the quick-release component connector including a spring that biases the trigger into a locking position in which the tab of the trigger is received by the square-shaped aperture of the second tube, and the male and female members of the coupler mating together in the interior region of the connector housing.

A lawn tool 10 includes a driving assembly 12 and a plurality of driven assemblies 14 that are selectively attachable to driving assembly 12 as shown in FIG. 1. Driving assembly 12 includes a motor 16 and a first tube 18. First tube 18 has a first end 20 coupled to motor 16 and a second end 22 spaced apart from motor 16. Driving assembly 12 further includes a connector 24 mounted to second end 22 of first tube 18. A first output shaft 26 is coupled to motor 16 and extends therefrom within first tube 18 as shown in FIGS. 2, 3, 5 and 6. When motor 16 is operated, first output shaft 26 rotates within first tube 18.

Each of the plurality of driven assemblies 14 includes an implement 28 and a second tube 30 as shown in FIG. 1. Second tube 30 has a first end 32 coupled to implement 28 and a second end 34 spaced apart from implement 28. A second output shaft 36 is coupled to implement 28 and extends therefrom within second tube 30. Lawn tool 10 further includes a coupler 38 having a first coupling member 40 associated with first output shaft 26 adjacent to second end 22 of first tube 18 and a second coupling member 42 associated with second output shaft 36 adjacent to second end 34 of second tube 30.

Connector 24 includes a housing or adapter tube 44 and a trigger 46 coupled to housing 44 for movement between a locking position and a releasing position. Housing 44 is formed to include an interior region 48. Second end 22 of first tube 18 is received in interior region 48 and a screw 50 threadedly couples housing 44 to first tube 18 so that connector 24 is secured to first tube 18. Second end 34 of second tube 30 of each driven assembly 14 is configured for insertion into and removal from interior region 48 of housing 44.

Thus, lawn tool 10 has the single motor 16 and a variety of implements 28 that are separately attachable to motor 16 to accomplish a variety of lawn and gardening tasks. Lawn tool 10 includes quick-release component connector 24 that allows the various lawn tool implements 28 to be attached to and detached from motor 16 with relative ease. Consumers will appreciate the cost savings associated with purchasing just a single motor to which different lawn tool implements attach to accomplish various lawn and gardening tasks.

In use, a user selects a desired driven assembly 14 and aligns second tube 30 with first tube 18. The user then moves trigger 46 to the releasing position and inserts second end 34 of second tube 30 into interior region 48 of housing 44. After second end 34 of second tube 30 is inserted into interior region 48, trigger 46 is moved to the locking position engaging second tube 30 as shown in FIG. 3. Engagement of trigger 46 with second tube 30 prevents second tube 30 from moving axially and rotationally relative to housing 44, thereby locking first and second tubes 18, 30 together. As second tube 30 is inserted into interior region 48 of housing 44, second coupling member 42 automatically mates with first coupling member 40 so that after first and second tubes 18, 30 are locked together by connector 24, first output shaft 26 is coupled to second output shaft 36.

Operation of motor 16 rotates first output shaft 26 relative to first tube 18 as previously described. When first and second tubes 18, 30 are locked together by connector 24, rotation of first output shaft 26 by motor 16 rotates coupler 38 which, in turn, rotates second output shaft 36 relative to second tube 30. Rotation of second output shaft 36 results in movement of implement 28.

Implement 28 of each driven assembly 14 is configured to accomplish lawn and gardening tasks that are different from the implements 28 of each of the other driven assemblies 14. For example, one illustrative implement 28 is a string trimmer 52 having a rotating hub 54 and string 56 extending outwardly from rotating hub 54. Another illustrative implement 28 is a brush blade 58 that is used to cut down thick brush. A further illustrative implement 28 is an edger 60 having an edger blade 62 and a blade cover 64. It is within the scope of the invention as presently perceived for driven assembly 14 to be provided with other types of implements 28 as well.

Figure 5:
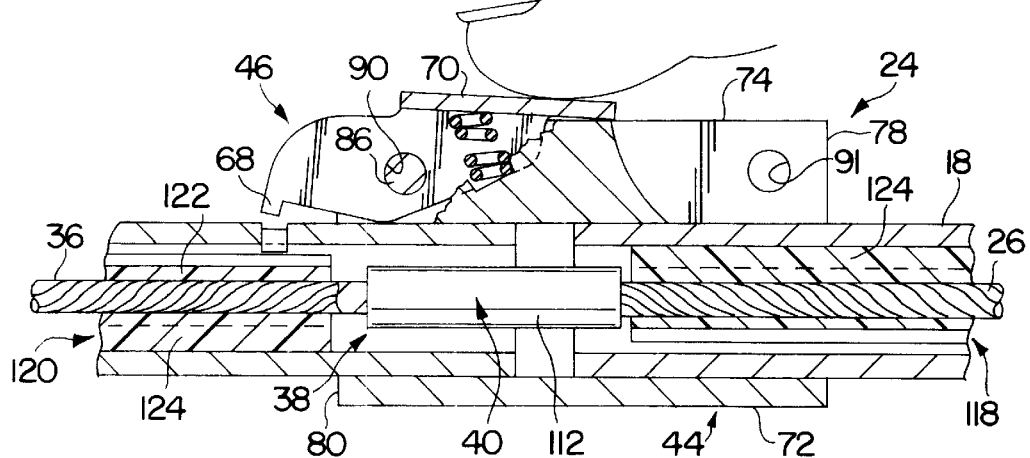
FIG. 5 is a sectional view of the lawn tool portion similar to FIG. 3 showing the trigger being pressed to a releasing position in which the tab of the trigger is moved out of the square-shaped aperture of the second tube and showing the spring being compressed between the thumb pad of the trigger and the connector housing when the trigger is in the releasing position.
Figure 6:
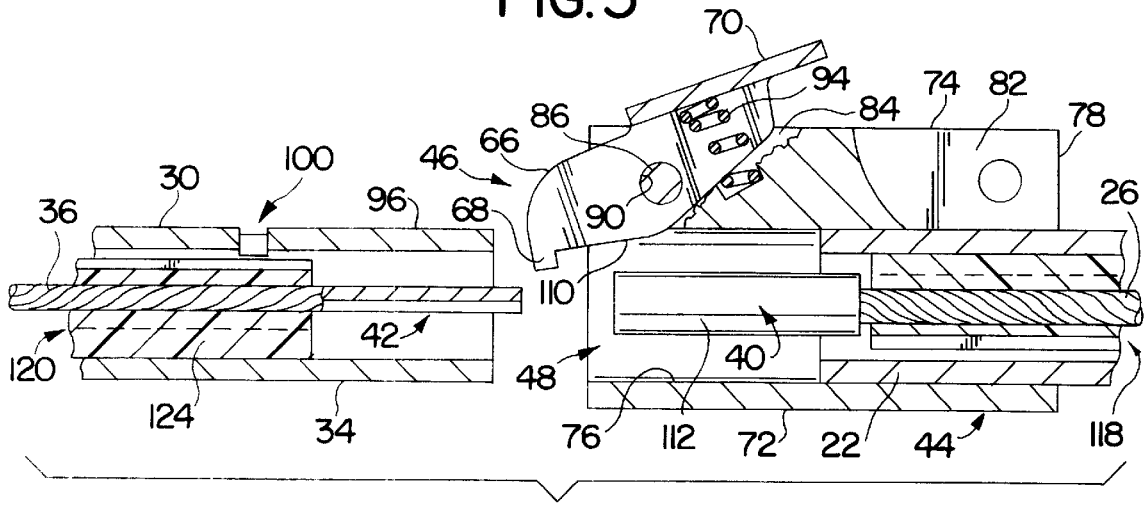
FIG. 6 is a sectional view of the lawn tool portion similar to FIG. 5 showing the second tube pulled away from the quick-release component connector so that the male and female members of the coupler are decoupled from one another.

After the user is finished with a particular driven assembly 14, the user detaches driven assembly 14 from driving assembly 12 by moving trigger 46 from the locking position, shown in FIG. 3, to the releasing position, shown in FIG. 5, and pulling second tube 30 away from connector 24 so that second end 34 of second tube 30 is no longer received in interior region 48 of housing 44 as shown in FIG. 6. Thus, lawn tool 10 has a single motor 16 and a variety of implements 28 that are attachable to and detachable from motor 16. A user selects the appropriate driven assembly 14 depending upon the task to be accomplished by lawn tool 10. Connector 24 is configured to allow for quick and easy attachment and detachment of driven assemblies 14 relative to driving assembly 12. The user manipulates trigger 46 with one hand while gliding second tube 34 into or out of interior region 48 of housing 44 with the other hand.

Connector 24 includes housing 44 and trigger 46 as previously described. Trigger 46 includes a vertical plate 66, a tab 68 appended to vertical plate 66, and a thumb pad 70 appended to vertical plate 66 in perpendicular relation therewith as shown in FIG. 2. Housing 44 of connector 24 includes an outer surface 72 having a top flat portion 74, a substantially cylindrical inner surface 76 that bounds interior region 48, a first end face 78, and a second end face 80. A first slot 82 and a second slot 84 are formed in housing 44 as shown in FIG. 2. First and second slots 82, 84 extend between top flat portion 74 and inner surface 76. First slot 82 interrupts first end face 78 and second slot 84 interrupts second end face 80. Housing 44 includes a portion 88 that separates first and second slots 82, 84.

Vertical plate 66 of trigger 46 is positioned to lie within second slot 84 as shown in FIGS. 2 and 4. A pivot pin 86 extends through an aperture 90 formed in vertical plate 66 to pivotably couple trigger 46 to housing 44 as shown in FIGS. 3, 5 and 6. Pivot pin 86 is arranged in perpendicular relation with first and second tubes 18, 30. Vertical plate 66 extends out of second slot 84 past second end face 80 and away from first tube 18 as shown, for example, in FIG. 2. Tab 68 is appended to vertical plate 66 outside of second slot 84. Thumb pad 70 is positioned to lie above top flat portion 74. When trigger 46 is in the locking position, thumb pad 70 is spaced apart from top flat portion 74, as shown, for example, in FIG. 3. When trigger 46 is in the releasing position, thumb pad 70 engages top flat portion 74 as shown in FIG. 5.

By providing first and second slots 82, 84 in housing 44, housing 44 can be attached to second end 22 of first tube 18 in either of two orientations. A first orientation, in which first end face 78 faces toward motor 16 and second end face 80 faces away from motor 16, is shown in FIGS. 1–6. In a second orientation, first end face 78 faces away from motor 16 and second end face 80 faces toward motor 16. Thus, housing 44 is axially reversible. If housing 44 is attached to first tube 18 in the second orientation, trigger 46 is coupled to housing 44 so that vertical plate 66 is received in first slot 82 rather than second slot 84. Housing 44, therefore, includes two sets of pin-receiving apertures 91, one set of which extends through the portions of housing 44 on opposite sides of first slot 82 and the other set of which extends through portions of housing 44 on opposite sides of second slot 84. The set of pin-receiving apertures 91 that receives pivot pin 86 is determined by whether housing 44 is mounted to first tube 18 in the first orientation or the second orientation.

Housing 44 is formed to include a cylindrical spring-receiving chamber 92 as shown best in FIG. 4. Connector 24 includes a spring 94 received in spring-receiving chamber 92 and extending upwardly therefrom into engagement with thumb pad 70 of trigger 46. Spring 92 is maintained in a state of compression between housing 44 and thumb pad 70 so that trigger 46 is biased toward the locking position. When trigger 46 is moved from the locking position to the releasing position, spring 94 further compresses between housing 44 and thumb pad 70 as shown in FIG. 5. After the user inserts second end 34 of second tube 30 into interior region 48 of housing 44 and releases trigger 46, spring 94 biases trigger 46 into engagement with second tube 30.

Second tube 30 includes a cylindrical outer surface 96 and a cylindrical inner surface 98 that is substantially concentric with outer surface 96. An aperture 100 is formed in second tube 30 adjacent to second end 34 thereof. Aperture 100 is square shaped and extends through second tube 30 between outer and inner surfaces 96, 98. When second end 34 of second tube 30 is received in interior region 48 of housing 44 and trigger 46 is in the locking position, tab 68 is received in aperture 100 with a terminus 101 of tab 68 positioned in aperture 100 of second tube 30 and a bottom edge 110 of trigger 66 engages outer surface 96 of second tube 30 as shown in FIG. 3.

Aperture 100 and tab 68 are sized to closely mate together so that when tab 68 is received in aperture 100, only a minimal amount of clearance exists between tab 68 and second tube 30. In addition, second tube 30 and housing 44 are sized to closely mate together so that when second end 34 of second tube 30 is received in interior region 48, only a minimal amount of clearance exists between inner surface 76 of housing 44 and outer surface 96 of second tube 30. Thus, when second tube 30 is locked to first tube 18 by connector 24, second tube 30 moves by only a negligible amount, if at all, relative to connector 24.

Coupler 38 of lawn tool 10 includes first coupling member 40 and second coupling member 42 as previously described. First coupling member 40 is a female component having a socket 112 with a bore of square cross section and second coupling member 42 is a male component having a post 114 of square cross section as shown in FIG. 2. Socket 112 is swaged onto first shaft 26 and post 114 is formed in the end of second shaft 36 adjacent to second end 34 of second tube 30. When second tube 30 is inserted into interior region 48 of housing 44, post 114 automatically aligns with and enters the bore of socket 112.

Although the bore of socket 112 and post 114 have square cross sections, it is within the scope of the invention as presently perceived for post 114 and the bore of socket 112 to have any non-round cross section so long as rotational movement of first shaft 26 is transmitted through coupler 38 to second shaft 36. It is also within the scope of the invention as presently perceived for first and second coupling members 40, 42 to be reversed so that first coupling member 40 is a male component and second coupling member 42 is a female component. In addition, it is within the scope of the invention as presently perceived for coupler 38 to have other configurations such as a tongue-in-groove configuration.

Socket 112 is aligned with second end 22 of first tube 18 and post 114 is aligned with second end 34 of second tube 30 as shown in FIGS. 3, 5, and 6. A minimal amount of post 114 extends out of second tube 30 and a substantial amount of socket 112 extends out of first tube 18. However, it is within the scope of the invention for more or less of either of socket 112 and post 114 to extend out of respective first and second tubes 18, 30 and still be aligned therewith. In addition, either of socket 112 and post 114 could be coextensive with, completely inside, or completely outside respective first and second tubes 18, 30 and still be aligned therewith. Thus, socket 112 and post 114 can be at any one of a number of positions relative to first and second tubes 18, 30 so long as they mate together when second tube 30 is locked to housing 44 by trigger 46.

First shaft 26 is supported for rotation in first tube 18 by a first liner 118 and second shaft 36 is supported for rotation in second tube 30 by a second liner 120 as shown in FIGS. 2, 3, 5 and 6. First and second liners 118, 120 both include a cylindrical shaft-receiving portion 122 and a plurality of axially extending ribs 124 appended to shaft-receiving portion 122. Ribs 124 are spaced circumferentially about shaft-receiving portion 122. In addition, each rib 124 includes an outer edge 125 that engages the respective first and second tubes 18, 30 to support shaft-receiving portion 122 in coaxial relation with first and second tubes 18, 30. Socket 112 is coupled to a portion of first shaft 26 that extends axially beyond first liner 118. In addition, post 114 is formed in a portion of second shaft 36 that extends axially beyond second liner 120. Shaft-receiving portions 122 are hollow and first and second shafts 26, 36 engage respective shaft-receiving portions 122 in sliding bearing contact. However, it is within the scope of the present invention for other types of bearings, such as ball bearings, to be included in lawn tool 10 to support first and second shafts 26, 36 for rotation relative to respective first and second tubes 18, 30.

Second tube 30 of each driven assembly 14 includes a bent portion 126 between respective first and second ends 32, 34 thereof as shown in FIG. 1. First output shaft 26 and second output shaft 36 are flexible cables. Thus, second output shaft 36 conforms to bent portion 126 so that rotation of second coupling member 42 results in rotation of implement 28. First and second liners 118, 120 are made out of a flexible material, such as Nylon, so that second liner 120 also conforms to bent portion 126 of second tube 30. It is within the scope of the invention as presently perceived for first and second shafts 26, 36 to made of some other type of flexible material such as thick-walled plastic tubing of the type disclosed in U.S. Pat. No. 4,335,585 to Hoff, the assignee of which is the assignee of the present invention.

Although the invention has been described in detail with reference to a certain preferred embodiment, variations and modifications exist within the scope and spirit of the invention as described and as defined in the following claims.

We claim:

1. A lawn tool system including a driving assembly and a plurality of driven assemblies that are each separately and selectively attachable to the driving assembly
the driving assembly comprising
a motor,
a first tube coupled to the motor and having an end spaced apart from the motor,
an output shaft coupled to the motor and rotated by the motor, the output shaft extending within the first tube and having an end adjacent to the end of the first tube,
a first coupling member associated with the end of the output shaft, and
a connector including an adapter tube mounted to the end of the first tube and a trigger coupled to and extending beyond the adapter tube for movement between a releasing position and a locking position, and each of the plurality of driven assemblies comprising
an implement,
a second tube extending from the implement and having an end spaced apart from the implement,
a driven shaft coupled to the implement, rotation of the driven shaft moving the implement, the driven shaft extending within the second tube and having an end adjacent to the end of the second tube, and
a second coupling member associated with the end of the driven shaft, wherein coupling the end of the second tube to the adapter tube mates the second coupling member with the first coupling member so that the output shaft and the driven shaft rotate together, the trigger engaging the second tube when in the locking position to prevent axial and rotational movement of the second tube relative to the adapter tube, and the trigger being disengaged from the second tube when in the releasing position allowing the second tube to be separated away from the adapter tube.

2. The lawn tool system of claim 1, wherein the output shaft of the driving assembly and the driven shaft of each driven assembly are flexible.

3. The lawn tool system of claim 1, wherein the implement of one of the driven assemblies is a string trimmer.

4. The lawn tool system of claim 1, wherein the implement of one of the driven assemblies is a brush saw.

5. The lawn tool system of claim 1, wherein the implement of one of the driven assemblies is an edger.

6. The lawn tool system of claim 1, wherein the second tube of each of the driven assemblies includes a bent portion adjacent to the implement.

7. The lawn tool system of claim 6, wherein the driven shaft is a flexible shaft that conforms to the bent portion of the second tube.

8. The lawn tool of claim 1, wherein the adapter tube includes an interior region, the second tube is formed to include an aperture positioned outside of the interior region of the adapter tube, and the trigger engages the aperture while in the locking position.

9. The lawn tool of claim 1, wherein the trigger includes a bottom edge and a tab positioned to engage the second tube away from the adapter tube.

10. A lawn tool comprising
a first tube having an end,
a first output shaft extending within the first tube and having an end aligned with the end of the first tube,
a motor coupled to the first output shaft and operable to move the first output shaft relative to the first tube,
a second tube having an end,
a second output shaft extending within the second tube and having an end aligned with the end of the second tube,
an implement coupled to the second output shaft for movement therewith relative to the second tube, and
a connector including a housing and a trigger coupled to the housing, the housing being coupled to the end of the first tube, the end of the second tube being adapted to couple to the housing, the first and second output shafts moving together in response to operation of the motor when the end of the second tube is coupled to the housing, the trigger being movable relative to the housing between a locking position engaging the second tube at a location away from the housing to lock the second tube to the housing and a releasing position allowing the second tube to be separated away from the housing.

11. The lawn tool of claim 10, wherein the second tube is formed to include an aperture adjacent to the end thereof, the trigger includes a tab received in the aperture when in the locking position, and receipt of the tab in the aperture orients the second tube axially and rotationally relative to the first tube.

12. The lawn tool of claim 11, wherein the aperture is square shaped and extends completely though the second tube.

13. The lawn tool of claim 11, wherein the connector further includes a spring engaging the trigger to bias the trigger toward the locking position.

14. The lawn tool of claim 13, wherein the trigger includes a first plate and a thumb pad extending from the first plate in perpendicular relation therewith, the tab is appended to the first plate, and the spring is interposed between the thumb pad and the housing.

15. The lawn tool of claim 10, further comprising a coupler including a first member coupled to the first output shaft and a second member coupled to the second output shaft, the first member of the coupler mating with the second member of the coupler when the second tube is coupled to the housing, and movement of the first output shaft by the motor acts through the coupler to move the second output shaft to move the implement coupled to the second output shaft.

16. The lawn tool of claim 15, wherein one of the first and second members of the coupler is a male member and the other of the first and second members of the coupler is a female member.

17. The lawn tool of claim 16, wherein the first and second shafts are flexible.

18. The lawn tool of claim 10, wherein the trigger pivots relative to the housing about an axis that is perpendicular to the first and second tubes.

19. The lawn tool of claim 10, wherein one of the first and second output shafts includes a cable and a socket coupled to the cable, the end of the other of the first and second output shafts is formed into a post having a non-round cross section, and the socket cooperates with the post to provide the lawn tool with a coupler that transmits movement between the first and second output shafts.

20. The lawn tool of claim 10, wherein the trigger includes a bottom edge and a tab positioned to engage the second tube away from the housing.

21. The lawn tool of claim 10, wherein the trigger includes a plate extending beyond the housing and a tab coupled to the plate to engage the second tube.

22. A lawn tool comprising
a first tube having an end,
a first output shaft extending within the first tube and having an end aligned with the end of the first tube,
a motor coupled to the first output shaft and operable to move the first output shaft relative to the first tube,
a second tube having an end,
a second output shaft extending within the second tube and having an end aligned with the end of the second tube,
an implement coupled the second output shaft for movement therewith relative to the second tube, and
a connector including a housing and a trigger coupled to the housing, the housing being coupled to the end of the first tube, the end of the second tube being adapted to couple to the housing, the first and second output shafts moving together in response to operation of the motor when the end of the second tube is coupled to the hosing, the trigger beings movable relative to the housing between a locking position engaging the second tube to lock the second tube to the housing and a releasing position allowing the second tube to be separated away from the housing the trigger including a bottom edge resting against the second tube with the trigger being in the locking position.

23. The lawn tool of claim 22, wherein the housing includes an interior region, the second tube is formed to include an aperture positioned outside of the interior region of the housing, and the trigger engages the aperture while in the locking position.

24. The lawn tool of claim 22, wherein the trigger further includes a tab positioned to engage the second tube at a location away from the housing.

25. The lawn tool of claim 22, wherein the trigger further includes a plate extending beyond the housing and a tab coupled to the plate to engage the second tube.

26. A lawn tool comprising
a first tube having an end
a first output shaft extending within the first tube and having an end aligned with the end of the first tube,
a motor coupled to the first output shaft and operable to move the first output shaft relative to the first tube,
a second tube having an end,
a second output shaft extending within the second tube and having an end aligned with the end of the second tube,
an implement coupled to the second output shaft for movement therewith relative to the second tube, and
a connector including a housing and a trigger coupled to the housing, the housing being coupled to the end of the first tube, the end of the second tube being adapted to couple to the housing, the first and second output shafts moving together in response to operation of the motor when the end of the second tube is coupled to the housing, the trigger being movable relative to the housing between a locking, position engaging the second tube to lock the second tube to the housing and a releasing position allowing the second tube to be separated away from the housing, the housing of the connector including a slot, the trigger including a plate received in the slot, and the trigger including a thumb pad coupled to the plate above the slot.

27. The lawn tool of claim 26, wherein the connector further includes a pivot pin having a portion received in the slot and the plate of the trigger is pivotably coupled to the pivot pin within the slot.

28. The lawn tool of claim 27, wherein the connector further includes a spring interposed between the housing and the thumb pad and the pivot pin is positioned to lie between the spring and the thumb pad.

29. The lawn tool of claim 26, wherein the housing of the connector includes an outer surface, an inner surface, and an end face connecting the inner and outer surfaces, the slot interrupts the end face and extends between the inner and outer surfaces, and the plate of the trigger extends out of the slot past the end face of the housing.

30. A lawn tool comprising
a connector including a housing and a trigger coupled to the housing for movement between a locking position and a releasing position, the housing having an interior region, a first tube having an end received in the interior region of the housing, the first tube being fixed to the housing,
a second tube having an end configured for insertion into and removal from the interior region of the housing, the trigger engaging the second tube at a position outside the interior region of the housing to lock the second tube to the housing when the end of the second tube is inserted into the interior region of the housing and the trigger is in the locking position,
a first shaft inside the first tube,
a second shaft inside the second tube,
a coupler having a first member associated with the first shaft and a second member associated with the second shaft, the first and second members mating together when the second tube is inserted into the interior region of the housing,
a motor coupled to the first shaft, actuation of the motor rotating the first shaft relative to the first tube, and actuation of the motor rotating the second shaft relative to the second tube when the second tube is inserted into the interior region of the housing, and
an implement coupled to the second shaft, the implement moving when the second shaft is rotated.

31. The lawn tool of claim 30, wherein the second tube includes an outer surface and an aperture formed in the outer surface, the trigger includes a plate and a tab appended to the plate, and when the trigger is in the locking position, the plate engages the outer surface of the second tube and the tab extends into the aperture.

32. The lawn tool of claim 31, wherein the connector further includes a spring interposed between the trigger and the housing and the spring biases the plate into contact with the outer surface of the second tube when the trigger is in the locking position.

33. The lawn tool of claim 31, wherein the second tube includes an inner surface that is substantially concentric with the outer surface and the aperture extends between the inner and outer surfaces.

34. The lawn tool of claim 31, wherein the tab and the aperture are configured so that receipt of the tab in the aperture prevents the second tube from rotating relative to the first tube.

35. The lawn tool of claim 34, wherein the tab and the aperture are configured so that receipt of the tab in the aperture prevents the second tube from moving axially relative to the first tube.

36. A lawn too comprising
a connector including a housing and a trigger coupled to the housing for movement between a locking position an a releasing position, the housing having an interior region,
a first tube having an end received in the interior region of the housing the first tube being fixed to the housing,
a second tube having an end configured for insertion into and removal from the interior region of the housing the trigger engaging the second tube to lock the second tube to the housing when the end of the second tube is inserted into the interior region of the housing and the trigger is in the locking position,
a first shaft inside the first tube,
a second shaft inside the second tube,
a coupler having a first member associated with the first shaft and a second member associated with the second shaft, the first and second members mating together when the second tube is inserted into the interior region of the housing, a motor coupled to the first shaft, actuation of the motor rotating the first shaft relative to the first tube, and actuation of the motor rotating the second shaft relative to the second tube when the second tube is inserted into the interior region of the housing, and an implement coupled to the second shaft, the implement moving when the second shaft is rotated, the housing of the connector including an outer surface having a top flat portion, a substantially cylindrical inner surface that bounds the interior region, an end face extending between the inner and outer surfaces, and a slot extending axially from the end face part way through the housing, the slot extending between the top flat portion of the outer surface and the cylindrical inner surface, and a portion of the trigger being positioned to lie inside the slot.

37. The lawn tool of claim 36, wherein the trigger includes a vertical plate received in the slot, a thumb pad appended to the vertical plate above the top flat portion of the outer surface, and a tab appended to the vertical plate.

38. The lawn tool of claim 37, wherein the vertical plate includes a portion outside the slot and the tab is appended to the portion of the vertical plate outside the slot.

39. The lawn tool of claim 37, wherein the vertical plate extends out of the slot past the end face of the housing and the tab is appended to the vertical plate outside the slot.

40. The lawn tool of claim 36, wherein the housing includes a spring-receiving chamber formed in the top flat portion of the outer surface and the connector further includes a spring received in the spring-receiving chamber and extending past the top flat portion of the outer surface into contact with the trigger.

41. The lawn tool of claim 40, wherein the trigger includes a plate received in the slot, a thumb pad appended to the plate above the top flat portion of the outer surface, and a tab appended to the vertical plate, the spring contacting the thumb pad, and movement of the thumb pad toward the top flat portion of the outer surface compresses the spring.

42. A lawn tool comprising
a first tube having an end,
a first output shaft extending within the first tube and having an end aligned with the end of the first tube,
a motor coupled to the first output shaft and operable to move the first output shaft relative to the first tube,
a second tube having an end, an aperture adjacent to the end thereof, an outer surface, and an inner surface,
a second output shaft extending within the second tube and having an end aligned with the end of the second tube,
an implement coupled to the second output shaft for movement therewith relative to the second tube, and
a connector including a housing and a trigger coupled to the housing and including a tab having a terminus, the housing being coupled to the end of the first tube, the end of the second tube being adapted to couple to the housing, the first and second output shafts moving together in response to operation of the motor when the end of the second tube is coupled to the housing, the trigger being movable relative to the housing between a locking position with the terminus of the tab positioned in the aperture of the second tube to lock the second tube to the housing and a releasing position allowing the second tube to be separated away from the housing.

43. The lawn tool of claim 42, wherein the connector further includes a spring engaging the trigger to bias the trigger toward the locking position.

44. The lawn tool of claim 43, wherein the trigger includes a first plate and a thumb pad extending from the first plate in perpendicular relation therewith, the tab is appended to the first plate, and the spring is interposed between the thumb pad and the housing.

45. The lawn tool of claim 42, wherein the aperture is square shaped and extends completely though the second tube.

46. The lawn tool of claim 42, wherein the trigger includes a bottom edge that rests against the second tube when the trigger is in the locking position.

47. The lawn tool of claim 42, wherein the housing of the connector includes a slot, the trigger includes a plate received in the slot, and the trigger includes a thumb pad coupled to the plate above the slot.

48. The lawn tool of claim 47, wherein the housing of the connector includes an outer surface, an inner surface, and an end face connecting the inner and outer surfaces, the slot interrupts the end face and extends between the inner and outer surfaces, and the plate of the trigger extends out of the slot past the end face of the housing.

* * * * *